Figure 1:
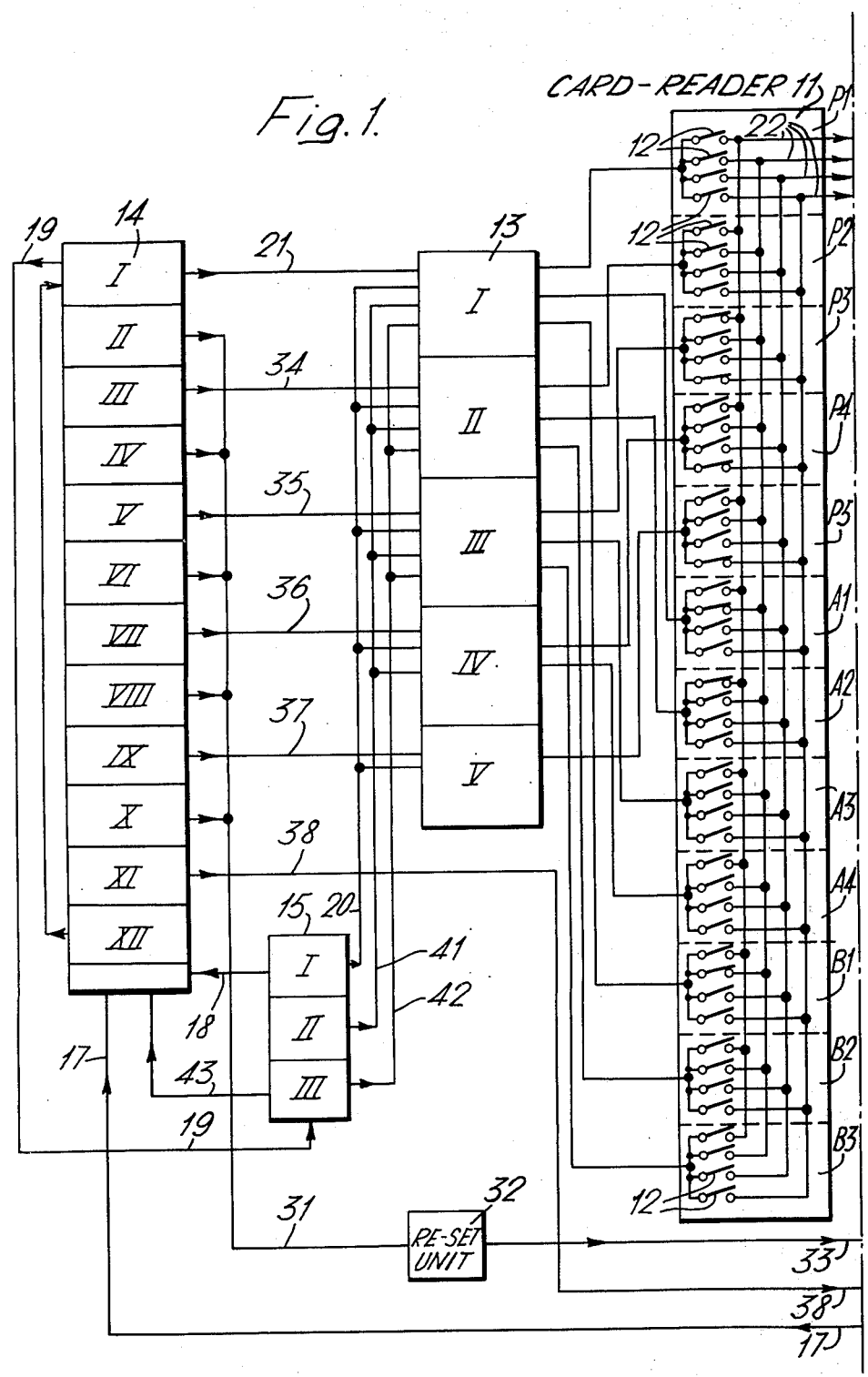

United States Patent [19]
Davies et al.

[11] 3,905,461
[45] Sept. 16, 1975

[54] ACCESS-CONTROL EQUIPMENT

[75] Inventors: Anthony Ivan Oliveira Davies, Gerrards Cross, England; James Goodfellow, Paisley, Scotland

[73] Assignee: Chubb Integrated Systems Limited, London, England

[22] Filed: May 1, 1967

[21] Appl. No.: 635,075

[30] Foreign Application Priority Data
May 2, 1966 United Kingdom............... 19319/66

[52] U.S. Cl. ............................................... 194/4 C
[51] Int. Cl. .............................................. G06k 7/00
[58] Field of Search .... 340/149 A; 235/61.7, 61.71, 235/61.7 B; 194/4, 4 C

[56] References Cited
UNITED STATES PATENTS

| | | | |
|---|---|---|---|
| 3,039,582 | 6/1962 | Simjian | 235/61.7 B |
| 3,097,347 | 7/1963 | Simjian | 235/61.7 B |
| 3,221,304 | 11/1965 | Enikeieff et al. | 235/61.7 UX |
| 3,255,339 | 6/1966 | Rausing | 235/61.7 |
| 3,355,576 | 11/1967 | Childers | 235/61.7 B |
| 3,436,736 | 4/1969 | Platt et al. | 194/4 |
| 3,453,598 | 7/1969 | Schweizer | 340/149 A |
| 3,513,298 | 5/1970 | Riddle | 194/4 UX |

*Primary Examiner*—Stanley H. Tollberg
*Attorney, Agent, or Firm*—Pollock, Philpitt & Vande Sande

[57] ABSTRACT

A money-dispensing system dispenses a pack of money upon request by an authorized bank-customer, the request involving presentation to a card-reader of the customer's individually-allotted punched-card, and operation of a set of ten push-buttons in accordance with the customer's personal-identification number. The system dispenses a pack of money only if there is correspondence between this number entered by the push-buttons and a number that is read by the card-reader from the card.

6 Claims, 2 Drawing Figures

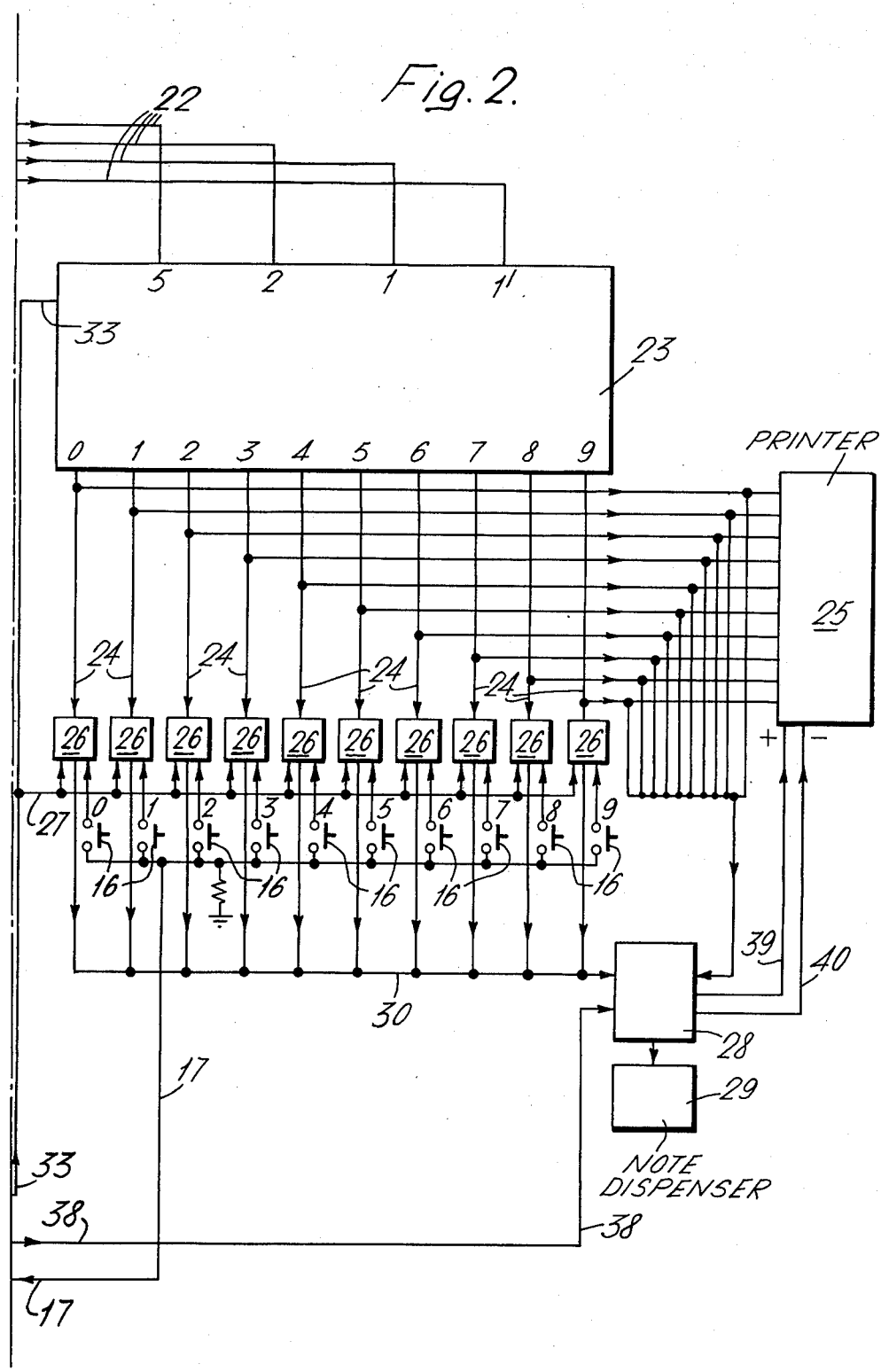

ACCESS-CONTROL EQUIPMENT

This invention relates to access-control equipment.

The invention is particularly concerned with access-control equipment of the kind that selectively enables access to a facility, under control of a coded token. The coded token may, for example, be in the form of a punched card, each person authorised to make use of the facility being issued with such a card for presentation to the equipment when access is required.

According to the present invention, access-control equipment for selectively enabling access to a facility, comprises first means for receiving a coded token presented to the equipment and for reading from the received token information encoded thereon, second means that is operable manually for entering into the equipment a plural-character word, the particular word entered being dependent upon manual selection, third means that is selectively operable for enabling access to said facility, and fourth means that is arranged to effect comparison for correspondence between the said information read from the token and the said word entered into the equipment and, in dependence upon whether a predetermined correspondence exists, to operate said third means as aforesaid.

The encoded information read from the token may relate to the identity of the particular person to whom the token has been issued, and in these circumstances said predetermined correspondence may be arranged to exist, and access to said facility may be enabled, only if such person is also identified by the plural-character word entered manually. This arrangement has the advantage of increased security over prior access-control equipment (for which presentation of an appropriately-encoded token is normally all that is required in order to gain access to the relevant facility) since the gaining of access is conditional not only upon the presentation to the equipment of an appropriately-encoded token, but also upon manual entry of the corresponding plural-character word. In order to reduce the possibility of the token being used fraudulently, the information as to identity is preferably encoded in a form that will not readily allow the corresponding plural-character word to be deduced from the token alone or by comparison of the token with other similarly-encoded tokens. The equipment also preferably includes provision for readily accommodating changes in the coding used, and for giving warning and inhibiting access to the facility in the event that, after a predetermined number of consecutive and unsuccessful attempts to gain access, the manually-entered word again does not have the required predetermined correspondence with the information read from the token presented.

The access-control equipment may be arranged to enable selectively, access to any form of facility, for example, entry to a restricted area, use of a service, or withdrawal of an item or product (in predetermined or selected quantity). One particular use of the equipment is in the field of banking where it is proposed to provide money-dispensing systems that would be available for use by customers at all times, the customers being issued with individual coded-tokens for presentation to any one of the dispensing systems when withdrawal of money is required. The equipment of the present invention in this latter connection may be arranged to control a money-dispenser so that money (for example, in bank-note form) is dispensed to the customer in response to each "request" for withdrawal, a request in this context being the combination of the presentation to the equipment of the customer's token and manual entry of the appropriate plural-character word. The system is preferably arranged such that the same amount of money, in the form of a single bank-note or a pack of bank-notes, is dispensed as a single item upon each request.

According to a feature of the present invention, an item-dispensing system comprises means for receiving a coded token presented to the system and for reading from the received token information encoded thereon, means which is operable manually for entering into the system a plural-character word, the particular word entered being dependent upon manual selection, item-dispensing means which is selectively operable to dispense from a reserve of items at least one such item upon each operation of the item-dispensing means, and means arranged to effect comparison for correspondence between the said information read from the token and the said word entered into the system and, in dependence upon whether a predetermined correspondence exists, to operate said item-dispensing means to dispense at least one of said items as aforesaid.

With both the item-dispensing system, and the access-control equipment as specified earlier, the plural-character word may be, at least in part, numerical, and in these circumstances the means for entering this word manually may include ten keys (for example, push-buttons) numbered "0" to "9" that are operable one at a time to enter the digits of the relevant number in ordered sequence. As an alternative, such means may include a dial mechanism comparable to a telephone dial, the relevant digits (and where applicable, other characters) being entered, in order, by sequential dialling operations.

The plural-character word entered in the item-dispensing system, or, more generally, in the access-control equipment, may be recorded, for example, by means of a printer or a digital data store. In addition, or alternatively, it may be arranged that it is the information read from the coded token that is recorded. The recording operation, in either case, may be arranged to take place each time the said predetermined correspondence is detected. However, it may be arranged that recording takes place each time a token is presented and there is manual entry of a word, whether or not the said predetermined correspondence exists; in these circumstances the arrangement is preferably such that a distinction is made in the record as between those occassions when the predetermined correspondence does, and does not, exist.

The coded token may carry encoded information additional to that to be compared with the manually-entered word. For example, in the circumstances in which the access-control equipment, or more specifically, the item-dispensing system, is for use in the dispensing of money, the token may carry in addition to information identifying the customer, information identifying the branch of the bank at which the customer has an account, and his account at that branch. Provision may be made that this additional information, like that compared with the manually-entered word, is read from the token and recorded so that the appropriate customer's account can be debited with the amount of money withdrawn.

An item-dispensing system including access-control equipment in accordance with the present invention, will now be described, by way of example, with reference to the accompanying drawings, in which:

FIG. 1 shows schematically the circuit arrangement of a part of the item-dispensing system, including a card-reader for reading digital information from a coded token presented to the system; and FIG. 2 shows schematically the remainder of the circuit arrangement of the item-dispensing system, including a set of ten push-buttons for entering a plural-digit word in the system manually.

The system shown in the drawings is for use in dispensing packs of bank-notes one at a time to customers of a bank, and is for installation at a branch of the bank to be accessible after, as well as during, normal banking hours. The customers authorised to use the system are each issued with a coded token in the form of a plastics card punched with holes. Each card carries numerical information encoded according to a binary-coded-decimal code by the presence and absence of holes in predetermined positions on the card. There are three numbers encoded in this way; one is a five-digit decimal number identifying the customer to whom the card has been issued, the second is a four-digit decimal number identifying the customer's account, and the third is a three-digit decimal number identifying the branch of the bank at which the account is held. The customer is informed of his five-digit personal-identification number, but the encoding of this number on the card is such that it cannot be readily deduced from the card. When the customer wishes to withdraw a pack of bank-notes from the system he simply inserts his punched card in the card-reader of the system, and operates the set of ten push-buttons in accordance with his personal-identification number. The system then automatically prints a record of the three identification numbers encoded on the card, and dispenses to the customer one pack of bank-notes. If withdrawal of more than one pack of bank-notes is required, the process is repeated by the customer, the card being released to him from the card-reader with the dispensing of each pack. (Alternatively, the system may retain the card so that a new card is required for each withdrawal.)

The set of push-buttons and the card-reader are preferably mounted in an external wall of the bank so as to be readily accessible to the customers, and in this connection provision is preferably made to protect the card-reader from interference. It may be arranged, for example, that access to the card-reader is restricted to entry of the card through a slot in a facia that carries the set of push-buttons on the external wall. In this case a card-transport mechanism may be arranged automatically to pass the card from the slot into the card-reader for reading, and to return the card through the slot in response to a signal that in the system initiates the dispensing of a pack of bank-notes.

Referring to the drawings, the card-reader 11 has 12 sets of reed switches 12 arranged to sense the information encoded on a customer's card (not shown) inserted in the card-reader 11. Five sets, P1 to P5, of the switches 12 are for sensing respectively the first to fifth digits of the personal-identification number, four sets, A1 to A4, are for sensing respectively the first to fourth digits of the account-identification number, whereas the remaining three sets, B1 to B3, are for sensing respectively the first to third digits of the branch-identification number (the digits in each case being referred to in descending order of significance). Each of the digits is represented on the card in a binary-coded decimal form using four binary digits, and accordingly each of the 12 switch-sets consists of four switches 12 for sensing respectively the values of the four binary digits. The switches 12 are each normally open or closed according to the coding being used, and of the 48 switches 12 involved in the card-reader 11 as shown, 40 are normally open and eight normally closed. When the customer's card is appropriately inserted in the card-reader 11, each switch 12 either remains in its normal state or is switched to the other state depending upon whether a hole is present or absent at the position on the card assigned to the relevant binary digit; if a hole is present the switch 12 remains in its normal state, but if a hole is absent then the switch is switched to the other state. The switches 12 are thus set in accordance with the numerical data encoded on the card, each of the 12 sets of switches 12 being set in accordance with the value of a respective decimal digit.

Electrical signals in accordance with the settings of the switches 12, and therefore in accordance with the three identification numbers encoded on the customer's card, are derived under control of a pulse-routing unit 13, a timing unit 14 and a sequencing unit 15. The process of deriving these signals is initiated by the customer's operation of the set of push-buttons 16. The push-buttons 16 are numbered 0 to 9, and operation of any one of these causes a pulse signal to be supplied to the timing unit 14 via a lead 17.

The timing unit 14 has 12 stages I to XII which are each normally in an OFF state, but which can be triggered, one at a time and in cyclic order, to an ON state. Each stage I to XII is basically astable such that once the stage is triggered to the ON state it remains in this state for a period of 40 milliseconds and then reverts to the OFF state, at the same time triggering the next succeeding stage to the ON state. In its basic, "cycling", mode therefore, the unit 14, once triggered, is free running so that the stages I to XII become ON in turn in an unbroken sequence. The unit 14, however, has an alternative "stepping", mode in which the sequence is broken, the inter-stage triggering between stages II and III, IV and V, VI and VII, and VIII and IX, being in this mode inhibited by the application to the unit 14 of an inhibiting-control signal via a lead 18. While this inhibiting-control signal is being applied, the sequence of operation of the unit 14 accordingly proceeds in steps, the successive steps being initiated only by external-triggering pulses supplied via the lead 17 in response to operation of the set of push-buttons 16.

When the customer first operates one or other of the push-buttons 16 to enter in the system the first (most significant) decimal digit of his personal-identification number, the resulting pulse supplied via the lead 17 to the unit 14 triggers stage I to the ON state. This in its turn causes a pulse to be supplied to the sequencing unit 15 via a lead 19. The sequencing unit 15 has three bistable stages I to III each of which has an ON, and an OFF, state, and the first triggering pulse received via the lead 19 sets the unit 15 to the state in which only stage I is ON. In this state, stage I of the unit 15 supplies a control signal via a lead 20 to each of five gating stages I to V of the pulse-routing unit 13, such that pulse signals supplied to these five gating stages are routed to the switch-sets P1 to P5 respectively. Additionally, stage I of the unit 15 in this state supplies an inhibiting-control signal to the lead 18 so as to condition unit 14 to operate in its stepping mode.

After the first triggering pulse received via the lead 17, stage I of the unit 14 remains ON for 40 milliseconds and during this time supplies a signal via a lead 21 to the gating stage I in the pulse-routing unit 13. The pulse signal of 40 milliseconds duration that is accordingly supplied to the lead 21 is routed through the gating stage I to the four switches 12 in the switch-set P1. This produces on four leads 22, pulse signals that provide a binary-encoded representation of the first (most significant) decimal digit in the personal-identification number on the card inserted in the card-reader 11. These signals on the leads 22 are supplied to a digital storage and decoding unit 23 that converts the binary-encoded representation into decimal form. The unit 23 (which includes a power-output stage not shown) has 10 output leads 24 corresponding respectively to the decimal digits 0 to 9, and the unit 23 supplies an electric direct current signal to whichever of these is appropriate to the decoded decimal digit. The 10 leads 24 are connected individually to the 10 digit-operating solenoids (not shown) of a printer 25, and to 10 bistable trigger circuits 26 associated respectively with the 10 push-buttons 16.

Each bistable circuit 26 is triggered from its normal, OFF state to an ON state only in response to operation of the push-button 16 associated therewith, and can be re-set to the OFF state only via the lead 24 individual to the bistable circuit 26, or via a lead 27 common to all 10 circuits 26. Thus when direct current is supplied by the unit 23 to any one of the leads 24, this primes the printer 25 for printing out the relevant decimal digit and also re-sets the bistable circuit 26 associated with the operated push-button 16. This re-setting of the bistable circuit 26 is, however, dependent upon there being correspondence between the digit entered in the system by the operation of this push-button 16, and the decoded decimal digit. If there is no such correspondence, the bistable circuit 26 remains in the ON state, direct current from the unit 23 being supplied, with no effect, to another of the circuits 26 already in the OFF state.

The existence of the condition in which the digit entered in the system by the operated push-button 16 does not correspond to the digit decoded from the card, is detected by an error-detecting unit 28 which controls operation of both the printer 25 and the bank-note dispenser 29. The unit 28 is responsive to the condition in which any one of the bistable circuits 26 remains in the ON state when direct current is applied to any one of the leads 24. To this end, the unit 28 is connected by a common lead 30 to each of the bistable circuits 26 and is also connected in common to the leads 24. If there is no correspondence, then one of the bistable circuits 26 is not re-set in response to the direct current and this sets the unit 28 to an error-indicating condition. On the other hand, if there is correspondence, all the bistable circuits 26 are in the OFF state when the direct current is applied, and the unit 28 is accordingly not set to the error-detecting condition.

When, after a period of 40 milliseconds from the operation of the push-button 16, stage I of the timing unit 14 reverts to the OFF state, stage II is thereby triggered to the ON state to remain in this state for a period of 40 milliseconds. As a consequence of this, a pulse signal is applied via a lead 31 to a re-set unit 32. The lead 31 is common to stages II, IV, VI, VIII and X of the unit 14, and each of these stages when in the ON state supplies a signal to the lead 31 that causes the re-set unit 32 to emit a re-setting pulse. The re-setting pulse is supplied to a lead 33 so as to re-set the store in the unit 23, and from the lead 33 is also supplied to the lead 27 so as to ensure that all the bistable circuits 26 are in the OFF state before any further operation of the push-buttons 16.

When the customer next operates one or other of the push-buttons 16 to enter in the system the second decimal digit of his personal-identification number, the resulting pulse applied via the lead 17 to the unit 14, triggers stage III to the ON state. The consequent pulse signal generated by stage III is supplied via a lead 34 to the gating stage II in the pulse-routing unit 13, and is routed thereby to the four switches 12 in the switch-set P2. The pulse signals accordingly derived on the leads 22 provide a binary-encoded representation of the second decimal digit in the personal-identification number on the card. This is decoded in the unit 23 and results in application of direct current to an appropriate one of the leads 24 so as to prime the printer 25 for printing out the relevant digit and so as to re-set the bistable circuit 26 associated with the operated push-button 16. If the customer has not entered the digit corresponding to that encoded on the card, then this fact is detected by the error-detecting unit 28, and causes the unit 28 to adopt the error-indicating condition if it is not already in this condition.

Stage IV of the unit 14 is triggered to the ON state when stage III reverts to the OFF state. This results in re-setting of the store in the unit 23 and ensures that all the circuits 26 are in the OFF state, as before.

The above-described process of entry of the digits of the customer's personal-identification number proceeds digit by digit for the third to fifth digits. Stages V, VII and IX of the unit 14 emit pulses on leads 35, 36 and 37 in response to the entry respectively of the third, fourth and fifth digits. These pulses on the leads 35, 36 and 37 are routed by the gating stages III, IV and V of the unit 13 to the switch-sets P3, P4 and P5 respectively, so as to apply the appropriate binary-encoded representations in turn to the unit 23. The printer 25 is in each case primed to print out the relevant digit, and, in the event that correspondence does not exist between the manually-entered and decoded digits, the error-detecting unit 28 is caused to adopt the error-indicating condition.

When the fifth digit has been entered and cleared from the store of unit 23, stage X of the unit 14 reverts to the OFF state, and this triggers stage XI to the ON state. In this state, stage XI applies a signal to the error-detecting unit 28 via a lead 38. Assuming that the unit 28 is not set to the error-indicating condition, the unit 28 passes this signal to the printer 25 via a control lead 39, so as to cause the primed printer 25 to print out the customer's personal-identification number in black. In the event that the unit 28 is in fact set to the error-indicating condition, the unit 28 passes the signal to the printer 25 via a control lead 40, so as to cause the printer 25 to print out the personal-identification number as read from the card, in red.

Stage XII of the unit 14 is triggered to the ON state when stage XI reverts to the OFF state, and after a delay of 40 milliseconds, triggers stage I to the ON state. When stage I is triggered to the ON state it emits a signal on the lead 19 that triggers stages I and II of the unit 15 to the OFF and ON states respectively. With stage II of unit 15 in the ON state, a control signal is applied via a lead 41 to each of the gating stages I to IV of the pulse-routing unit 13 such that pulse signals supplied via the leads 21, 34, 35 and 36 are routed to the switch-sets A1 to A4 respectively. Since the stage I of the unit 15 is in the OFF state, a signal is no longer applied to the lead 18 and so the unit 14 operates in its cycling mode, pulses (each of 40 milliseconds duration) being applied to the leads 21, 34, 35 and 36 in an uninterrupted sequence. These pulse signals routed in turn via the switch-sets A1 to A4, accordingly produce on the leads 22 binary-encoded representations of the four digits of the account-identification number encoded on the card. The unit 23 decodes each of these representations and applies direct current to the appropriate lead 24 to prime the printer 25 to print out the account-identification number. This number is printed out in response to the signal subsequently emitted by stage XI, the print-out being in black or red according to the condition of unit 28 resulting from the manual entry of the personal-identification number.

Stage I of the unit 14 is again triggered, in the cycling mode, to the ON state by stage XII after the print-out of the account-identification number. The consequent signal emitted on lead 19 triggers stages II and III of the unit 15 to the OFF and ON states respectively. With stage III of the unit 15 in the ON state, a control signal is applied to each of the gating stages I to III via a lead 42 of the pulse-routing unit 13, such that pulse signals supplied via leads 21, 34 and 35 are routed to the switch-sets B1 to B3 respectively. These pulse signals in turn produce on the leads 22 binary-encoded representations of the three digits of the branch-identification number encoded on the card. The unit 23 decodes these representations and appropriately primes the printer 25 so that the branch-identification number is printed out (in black or red as for the two previous numbers) when stage XI subsequently emits a signal on the lead 38. If the error-detecting unit 28 has not been set to its error-indicating condition, the unit 28 at this time enables operation of the bank-note dispenser 29 to dispense to the customer one pack of bank-notes from a reserve of such packs, the three identification numbers relevant to the withdrawal having been recorded, in black, by the printer 25. On the other hand, if the error-detecting unit 28 has been set to the error-indicating condition, then the dispenser 29 is not enabled; a record of the three numbers encoded on the card used for the unsuccessful attempt at access is nonetheless made, this being in red. Provision may be made for the unit 28 to operate an alarm if a plurality of consecutive, and unsuccessful, attempts are made to gain access.

Once the three numbers from the card have been recorded the system is automatically prepared for use again. While stage III of unit 15 is in the ON state a signal is applied via a lead 43 to break the inter-stage triggering between stages XII and I of the unit 14. Continuation of the free-running operation of the timing unit 14 is thereby inhibited, and such unit therefore remains inoperative until the push-buttons 16 are next operated by a customer.

Although in the above example the personal, account and branch identification numbers are of five, four and three digits each, other numbers of digits (for example, six, six and five digits respectively) quite clearly may be used. In addition, any other form of card-reader (for example, one operated photoelectrically) may be used, and provision may be made for readily changing the coding used. In this latter respect, the system may be arranged such that the coding used is dependent upon information read from a card that is inserted in an additional card-reading means provided in the system. The additional card-reading means is preferably situated in a secure part of the installation such that only an authorised bank-official has access to the coding-card and can replace it by another such card whenever a coding change is required.

As an additional proposal for increasing security, the personal-identification number may be encoded on each card using randomly-selected positions on the card. In these circumstances the customer is required to enter two numbers into the system, the first of these identifying (in the appropriate order) the positions of the card that are to be sensed to read the personal-identification number. The second number is the personal-identification number itself, as required for correspondence-checking purposes.

We claim:

1. Access-control equipment for selectively enabling access to a facility comprising:
    first means for receiving a coded token presented to the equipment to read from the received token information encoded thereon,
    second means that is operable manually for entering into the equipment a plural-character word, the word entered being dependent upon manual selection,
    third means that is selectively operable for enabling access to said facility,
    fourth means to effect comparison for correspondence between said information read from the token and said word entered into the equipment, said fourth means including means to operate said third means to enable access to said facility in dependence upon whether a predetermined correspondence exists between said information and said manually entered word,
    and recording means including a printer for providing a printed record of said information.

2. Access-control equipment according to claim 1 wherein said recording means is operable to record said information with selectively either of two distinctive characteristics, and wherein said equipment includes means responsive to the result of the comparison effected by said fourth means to operate the said recording means to record said information with one of said characteristics when said predetermined correspondence exists and to record said information with the other said characteristic when said predetermined correspondence is absent.

3. An item-dispensing apparatus comprising:
    means for receiving a coded token presented to the apparatus to read from the received token information encoded thereon;
    means which is operable manually for entering into the apparatus a plural-character word, the particular word entered being dependent upon manual selection;
    item-dispensing means that is selectively operable to dispense at least one item from a reserve of items upon each operation of the item-dispensing means, comparator means to effect comparison for correspondence between said information read from the token and the said word entered into the apparatus, said comparator means including means to operate said item-dispensing means to dispense said at least one item in dependence upon whether a predetermined correspondence exists between said information and said manually entered word, and means controlled by said comparator means for making a distinctive recording indicative of the dispensing of an item only in the event of correspondence between said plural character word entered manually into the equipment and said information read from the received token to thereby enable the printing out of billing information to an account related to said information read from the token.

4. An item-dispensing system in a bank according to claim 3, said item-dispensing means being means to dispense packets of money.

5. An item-dispensing system according to claim 4 including means for reading from said token information additional to said information compared with said manually-entered word, and means for recording said additional information.

6. A method of machine-authorized dispensing in accordance with a customer's request using a card encoded with a customer-related number comprising:

inserting the card into the machine unaccompanied by any other item, manually setting into said machine a code number individual to the customer, reading through the machine the customer-related number encoded on the card, comparing through the machine the customer-related number read from the card with the manually entered number to detect whether a predetermined unique relationship exists between the two numbers, mechanically performing a dispensing operation to the customer only upon detection that said unique relationship exists but independently of any requirement for insertion into the machine by the customer of any item other than said card, and machine recording the customer-related number read from the card to provide, only when said comparing step shows that said unique relationship exists, a record indicative of the dispensing operation to thereby enable the printing out of billing information directed to said customer related number.

* * * * *